(12) United States Patent
Cleary et al.

(10) Patent No.: US 9,795,813 B2
(45) Date of Patent: Oct. 24, 2017

(54) PRECISION CONTAINER AERIAL DELIVERY SYSTEM

(71) Applicants: William W. Cleary, Pasadena, CA (US); Ty Bonnar, Simi Valley, CA (US)

(72) Inventors: William W. Cleary, Pasadena, CA (US); Ty Bonnar, Simi Valley, CA (US)

( * ) Notice: Subject to any disclaimer, the term of this patent is extended or adjusted under 35 U.S.C. 154(b) by 0 days.

(21) Appl. No.: 14/462,240

(22) Filed: Aug. 18, 2014

(65) Prior Publication Data

US 2014/0352987 A1    Dec. 4, 2014

Related U.S. Application Data

(62) Division of application No. 12/181,139, filed on Jul. 28, 2008, now abandoned.

(51) Int. Cl.
*A62C 8/00*     (2006.01)
*B64D 1/12*     (2006.01)

(52) U.S. Cl.
CPC ............. *A62C 8/005* (2013.01); *B64D 1/12* (2013.01)

(58) Field of Classification Search
CPC ....... A62C 3/023; A62C 8/005; A62C 3/0235; A62C 19/00; A62C 3/0228; B64D 1/16; B64D 1/12

USPC .............................. 169/36, 53, 70
See application file for complete search history.

(56) References Cited

U.S. PATENT DOCUMENTS

| | | | |
|---|---|---|---|
| 5,626,570 A | 5/1997 | Gallo | 604/345 |
| 5,976,118 A | 11/1999 | Steer | 604/332 |
| 7,009,029 B2 | 3/2006 | Oka et al. | 528/310 |
| 8,562,549 B2* | 10/2013 | Nardi | A61H 9/0092 601/151 |
| 2007/0065224 A1 | 3/2007 | Shaw | 401/201 |
| 2007/0090174 A1 | 4/2007 | Goddard | 229/100 |
| 2007/0163050 A1* | 7/2007 | Hense | 5/650 |

\* cited by examiner

*Primary Examiner* — Christopher Kim
(74) *Attorney, Agent, or Firm* — Sandy Lipkin

(57) ABSTRACT

An aerial fire suppressant delivery system uses an outer box or like structure and an inner liner. The inner liner may be a polyurethane bladder with two or more plastic straps RF welded to the polyurethane bladder. The two or more plastic straps are attached both to the bottom surface of the bladder and to the top of the outer box, which is not attached to the sides of the outer box. A fixed or rotary wing aircraft drops the container filled with fire suppressant material. As the container falls, the top of the box flies from the sides of box and the top pulls against the straps. Because the straps are attached to the bladder by RF welding, the straps tear the bladder at their attachments and cause the bladder and container to release the fire suppressant material into the air over the target.

1 Claim, 3 Drawing Sheets

PRECISION CONTAINER AERIAL DELIVERY SYSTEM

CROSS-REFERENCE TO THE RELATED APPLICATIONS

This application is a divisional of U.S. application Ser. No. 12/181,139, filed on Jul. 28, 2008, which is incorporated herein by reference.

BACKGROUND

1. Field of the Invention

The present invention relates to the field of aerial firefighting and, more specifically, to the field of air delivery systems for liquid or powder materials including those that might be used as fire suppressant materials.

2. Description of the Related Art

Aspects of the present invention relate to air delivery systems for firefighting suppressants such as water or fire retardant chemicals in liquid or powder form. The most prevalent current air delivery system for fire suppressant materials uses fixed or rotary wing aircraft to carry fire suppressant material to a target and release the fire suppressant material over the fire or other target. Fire suppressant materials such as water, Phos-Chek®, FIRE-TROL® or others can be delivered this way. Often the fire suppressant material is carried in an internal or external reservoir of the fixed or rotary wing aircraft, typically using a reservoir specifically modified for air distribution of such fire suppressant materials.

U.S. Pat. No. 7,009,029 to Cleary, et al., describes an example of an improved air delivery system for fire suppressant material. The Cleary patent describes the use of a plastic package (or "bomblet") for carrying and delivering firefighting suppressant materials in a more controlled way. In the air delivery system described in the Cleary patent, the plastic packages are filled with fire suppressant materials, loaded on appropriate delivery aircraft for transport to the target and then the filled plastic packages are dropped on the target area. Use of the plastic packages allows the aircraft to deliver some or the entire load of filled plastic packages over one or more desired target areas. Significantly, use of the plastic packages allows the delivery aircraft to fly at a higher altitude when delivering the fire suppressant material while still providing more controlled placement of the fire suppressant material at the target.

The plastic packages described in the Cleary patent are sufficiently rigid as to be freestanding when filled and capable of being shipped empty, filled with suppressant material and stacked together with other filled packages in the hold of an aircraft. The plastic package is designed to hold a quantity of, for example, fifty pounds of fire suppressant material. The plastic package is designed with a weak seam so that, after being dropped from the airplane, a filled plastic package ruptures above the ground due to wind velocity or contact with trees or other above-ground objects.

A variation on the Cleary patent's plastic package for fire suppressant materials is illustrated in U.S. Patent Publication No. 2007/0090174 to Goddard. The Goddard publication describes a container for fire suppressant and similar materials with a larger capacity than the package of the Cleary patent but which is otherwise used in a manner similar to the Cleary patent package in delivering fire suppressant or other materials. The Goddard publication container is made up of a base, a sidewall assembly that is placed on the base and a top that can be held against the container formed of the base and sidewall by a straps. The Goddard publication container may be containerboard or corrugated containerboard. The Goddard publication container may also include a liquid impermeable polymer bag connected to the straps that extend from the top of the container into the container. If such a bag is included, the straps are heat welded to the bag.

SUMMARY OF THE PREFERRED EMBODIMENTS

An aspect of the present invention provides an aerial material delivery method of a type appropriate for delivering fire suppressant materials from an aircraft. The aerial material delivery method comprising forming a bladder that can act as a liner within an outer container that comes apart when the outer container is dropped from the aircraft. The method of forming the bladder comprises RF welding at least one plastic strap to a lower plastic sheet to form a weld between the at least one plastic strap and the lower plastic sheet. The method also includes attaching a top plastic sheet to the lower plastic sheet and further processing to form a sealable bladder, wherein the weld is characterized by causing the sealable bladder to rupture in response to a predetermined force.

BRIEF DESCRIPTION OF THE DRAWINGS

Embodiments of the present invention are described below with reference to the drawings, which form a part of the disclosure.

DETAILED DESCRIPTION OF THE PREFERRED EMBODIMENTS

Figure 1:
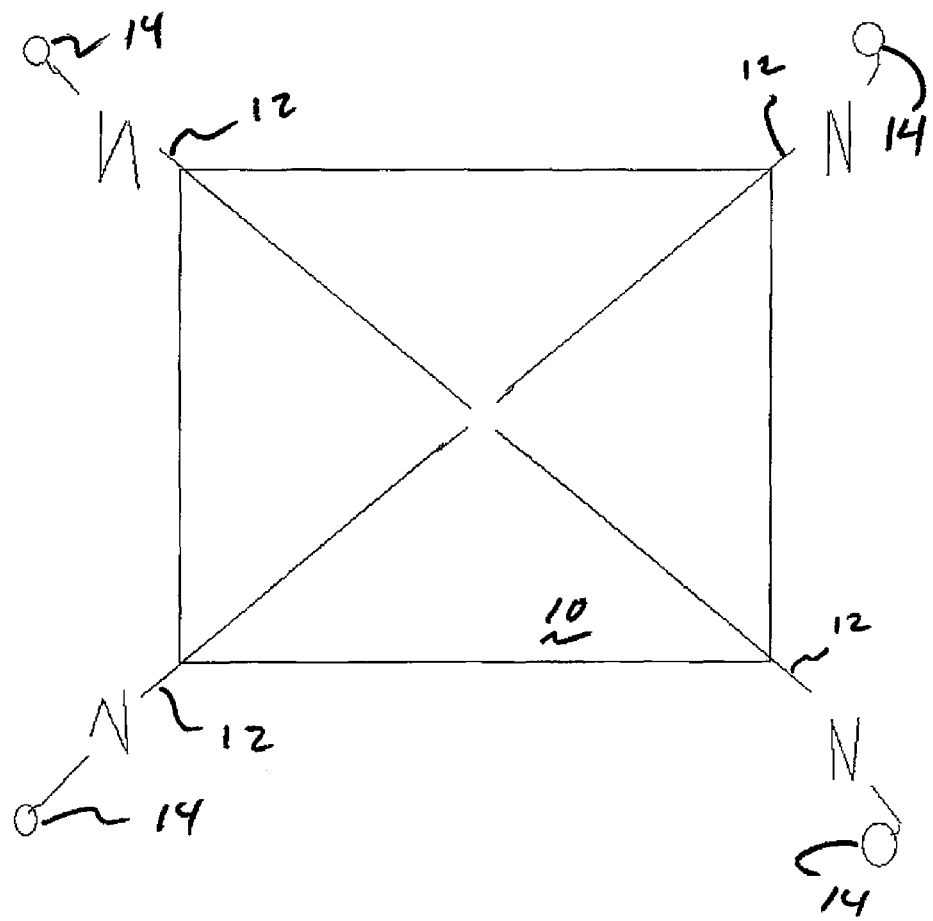
FIG. 1 provides a view of the bottom sheet of bladder, including the straps RF welded to the bottom sheet.

An aspect of the present invention provides a container for fire suppressant materials for an aerial firefighting system. Preferably, the container includes an outer box or like structure and an inner liner compatible with the outer box and adapted to be loaded with and hold firefighting suppressant materials when within the outer box. The inner liner may be a polyurethane bladder with two or more plastic straps most preferably radio frequency (RF) welded to the polyurethane bladder. An opening for filling the bladder is positioned on the opposite side of the bladder from the RF welding that holds the straps. The outer box and inner liner can be assembled and filled with a fire suppressant material and loaded onto a fixed or rotary wing aircraft using conventional loaders or material handling equipment.

The two or more plastic straps preferably are attached both to the bottom surface of the bladder and to the top of the outer box, and the top of the outer box preferably is not attached to the sides of the outer box. The aircraft drops the container filled with fire suppressant material over a target area for fire suppression. As the container falls, the top of the box flies (or is carried away) from the sides of box, and the top pulls against the straps. Because the straps are attached to the bladder by RF welding, the straps tear the bladder at their attachments and cause the bladder and container to release the fire suppressant material into the air over the target area.

The use of RF welding to attach the straps to the bladder in implementations of the present invention is particularly preferred because the RF welding is important to ensure that the bladder ruptures in a predictable and reliable manner upon delivery from an aircraft. Those of ordinary skill will appreciate that the predictable and reliable rupture of the bladder is fundamental to the use of the outer container and inner bladder system for firefighting applications. To be effective, the bladder should rupture after falling a predetermined distance from the aircraft. That is, it is important that the bladder not rupture until it is an appropriate distance from the aircraft. Also to be effective, the bladder should rupture sufficiently before hitting the ground. The system of outer container, inner bladder and straps is designed to proceed through a sequence of falling events that causes the straps to apply appropriate pressure to the RF welded joints with the bladder to rupture the bladder. The predictability of this sequence and of the bladder rupture allows a pilot to determine an appropriate delivery altitude for dropping the outer container and inner bladder system over a target area to effectively deliver the fire suppressant material or other desired payload.

Other aspects of the present invention provide an aerial firefighting method in which a fixed or rotary wing aircraft uses a container to deliver fire suppressant materials to a target. This fire suppressant material delivery system preferably uses a number of delivery vessels each having an outer, generally rigid container and an inner, generally flexible bladder adapted to hold liquids, powdered materials, combinations or liquids and powdered materials or other materials suited for aerial dispersion. The outer containers are preferably of a type that can be packed closely together within a cargo container or hold. The generally rigid outer container might, for example, be a containerboard, cardboard or fiberboard container (package) having a removable top with sides that are held in appropriately fixed positions when the outer container and inner bladder system are assembled and filled for shipment or for delivery from an airplane or other delivery system. Preferably the elements of the outer container are fitted together but are not connected together.

The top of the outer container is preferably connected to the bladder by straps such that the top can be positioned away from the outer container while the bladder is positioned within the outer container. Thus, the top of the outer container is not held to the sides of the outer container by the straps. Instead, the straps allow the top of the outer container to be pulled away from the sides of the outer container when the container is dropped from an airplane. The drag of the wind flow against the top pulls the top away from the outer container and pulls the straps against the bladder. Generally the bottom of the outer container separates from the sides of the outer container so that the bottom does not support the bladder and the straps during at least a portion of the fall. The outer container may, for example, have the configuration shown in U.S. Patent Publication No. 2007/0090174 to Goddard, which publication is incorporated here by reference in its entirety.

The generally flexible inner bladder might, for example, include a plastic bladder made from a film such as polyvinyl chloride (PVC) or a polyurethane film. The inner bladder is preferably connected to plastic straps through radio frequency or RF welding. This RF welding technique is important to the predictable operation of the fire suppressant material delivery system because the RF welding provides a very consistent interface that has predictable performance for tearing or ripping the bladder when an aircraft drops an outer container with filled inner bladder. Predictable performance includes the bladder rupturing at a desired distance from the drop altitude so that the contents of the outer container and bladder are dispersed in an effective manner at the target area. Effective dispersion of the material means that the material is provided to the target in an operable quantity without undue amounts of material carried away from the target. Effective delivery requires that the bladder remain intact for a predictable time after being dropped from the aircraft and that the bladder rupture a predictable time later so that the proper release altitude can be determined reliably.

A condition for effective rupture of the bladder is that the welds between the straps and the lower sheet rupture the bladder when a predetermined level of force is applied to the straps. The predetermined level of force is desirably that applied when the top of the outer container is caught by the Wind and pulled away from the outer container and when the bottom of the outer container has come away from the sides of the outer container and the bladder and the welds are exposed. Most preferably, the top of the container is oversized and not fixed to the sides of the container. This configuration, when the filled container is dropped from a fixed or rotary wing aircraft, allows the oversized top of the container to act like a parachute and to be pulled away from the filled container by the airflow of the container falling through the air. Most preferably the straps are connected to the oversized top so that, when the air catches the oversized top of a falling container, the straps become taught and rip the bladder open, creating a fire suppressant burst in the air.

Figure 2:
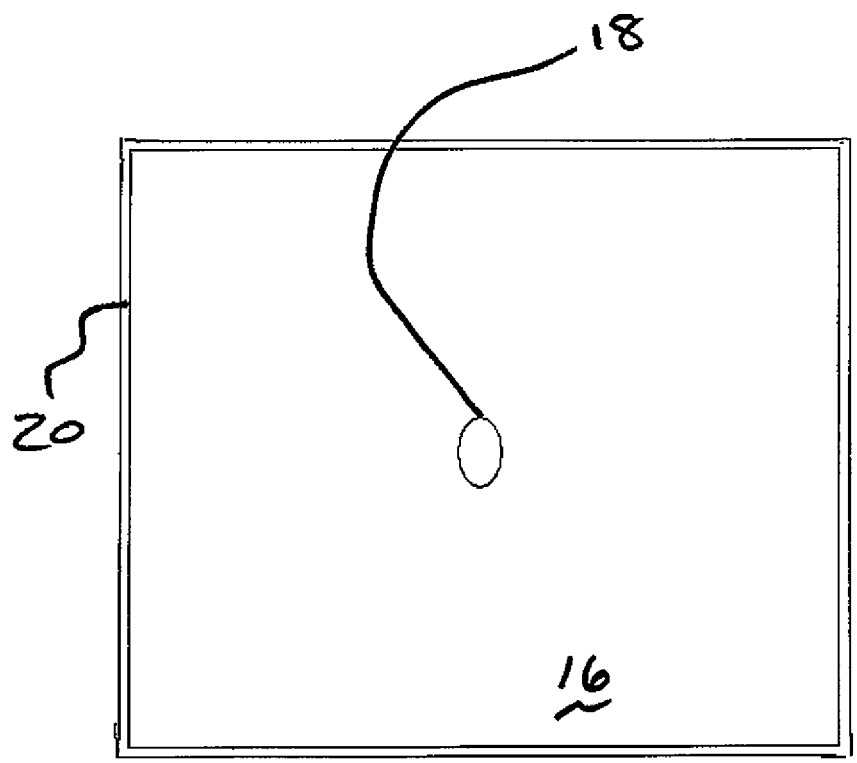
FIG. 2 provides a view of the top sheet of the bladder, including a fixture used to fill the bladder.
Figure 3:
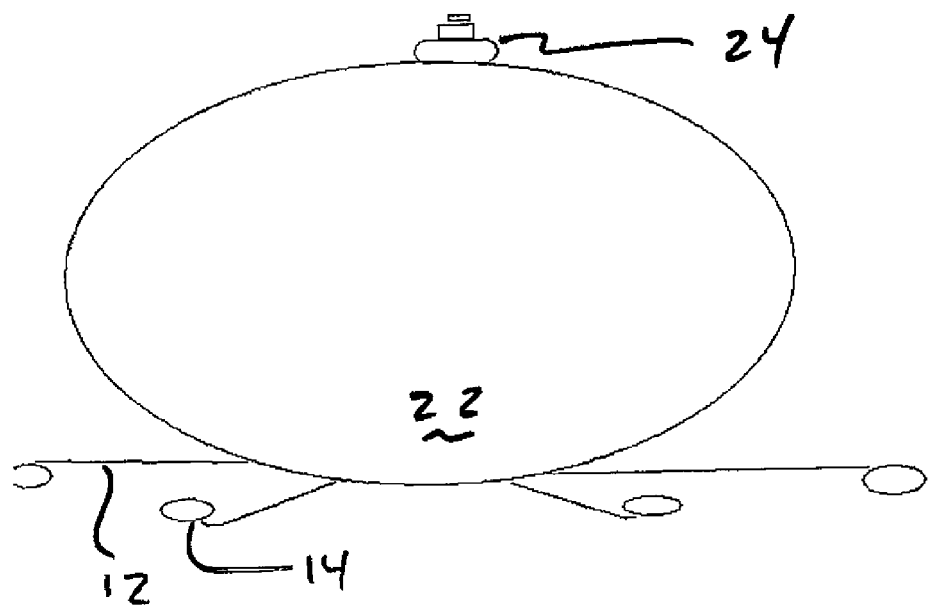
FIG. 3 illustrates the testing of an assembled bladder.

FIGS. 1-3 illustrate aspects of the bladder and its assembly. In a preferred embodiment, the inner bladder is formed from two plastic sheets of equal size. Depending on the availability of rolls of plastic sheet stock, the plastic sheets may be the width of a roll or can be a larger width formed from combining two or more full or part sheets using, for example, RF welding. In an illustrative embodiment, the top and bottom sheet components of the bladder may be square or rectangular, as is most appropriate to efficiently line the outer container. Those of ordinary skill will appreciate that the dimensions of the bladder and the outer container can be chosen with wide flexibility so as to provide a container that is manageable using conventional box handling equipment such as front end loaders while providing a useful amount of fire suppressant or other material in the container. As a general illustration, the bladder and outer container might be selected to hold between about 200 and 250 gallons of liquid material or an equivalent volume of dry, gel or foamed materials.

In particularly preferred embodiments, the bladder system is fabricated from a non-reinforced sheet, such as a clear plastic sheet. Exemplary stock for the sheet might, for example, be a six millimeter matte clear polyvinyl chloride (PVC) sheet or a six millimeter clear polyurethane sheet that most preferably is selected to be biodegradable. Various films or sheets can be used in the bladder system, although different welding protocols may be used for different plastic sheet stocks. The listed stocks are currently particularly preferred but are not intended to be limiting, as other film or sheet stock could be used in implementing a bladder according to the present invention.

FIG. 1 illustrates a bottom view of the bottom sheet 10 of the bladder, which may be six millimeter thick polyurethane. The sheet 10 may be rectangular and might, for example, be a square of about six and a half feet on a side. Four plastic straps 12, two inches wide and sixteen feet long, are attached in a pinwheel pattern extending away from the center of the sheet 10 and over the corners of the illustrated sheet 10. As explained above, the four straps 12 are RF welded to the bottom sheet 10 to provide a reliable joint with predictable tear characteristics. Preferably the weld between the lower sheet 10 and the strap 12 extends for about two feet. At the end of the straps 12 are loops 14 that can be used for connecting the straps to the top of an outer container. The loops need not be provided and the dimensions of the straps are illustrative only.

FIG. 2 shows a view of the top sheet 16. The top sheet is preferably of the same dimensions and material as the bottom sheet. Near the center of the top sheet is an opening 18 that is used for attaching a fitting that can be used for filling the bladder with fire suppressant or like materials and then sealing the bladder to hold the fire suppressant or like materials. Various fittings are known and can be used for this purpose. Preferably the fitting is at least partially polyurethane and is attached to the top sheet 16 using RF welding. After the straps 12 are attached to the lower sheet 10 and the fitting is provided in the opening 18 of the top sheet 16, the top sheet is fastened to the lower sheet. This is accomplished using a one quarter inch bar weld at the edges of the top and bottom sheets. The quarter inch bar weld is shown in FIG. 2 at 20.

FIG. 3 shows a view of an assembled bladder 22. The assembled bladder 22 can be tested for integrity and quality control by inflating the bladder 22 with air, sealing the fitting 24 and spraying soapy water. After spraying soapy water on the inflated bladder 22, the bladder 22 is visually examined to detect leaks. Testing for quality assurance is an important aspect of providing predictable and reliable container systems for delivering fire suppressant or like materials. Following testing, the bladder 22 is deflated, packaged, shipped and stored at appropriate locations for use in firefighting efforts.

As discussed in U.S. Pat. No. 7,009,029 to Cleary, et al., which is incorporated by reference here in its entirety, packaging fire suppressant materials for delivery to a fire target allows delivery aircraft to fly at a safer and more frequently available altitude while still providing effective fire suppression.

The fire suppression material delivery system described above can be used for delivering other materials. For example, materials for containing or absorbing oil spills may be dispensed using the outer container and inner bladder system described above.

The present invention has been described in terms of certain preferred embodiments. Those of ordinary skill in the art will appreciate that various modifications and alterations could be made to the specific preferred embodiments described here without varying from the teachings of the present invention. Consequently, the present invention is not intended to be limited to the specific preferred embodiments described here but instead the present invention is to be defined by the appended claims.

We claim:

1. A bladder configured to hold fire suppressant materials and configured to rupture when dropped from an aircraft, the bladder comprising:
    a plastic bottom sheet;
    a plurality of plastic straps, each of the plurality of plastic straps connected to the bottom sheet by an RF welded joint;
    each welded joint comprising an RF weld interface between the plastic bottom sheet and each of the respective plastic straps;
    a plastic top sheet connected to the plastic bottom sheet, thereby defining a bladder enclosure; and
    a liquid, gel or foam fire suppressant material contained within the bladder enclosure;
    wherein one or more of the RF welded joints ruptures the bladder enclosure when a predetermined force is applied to the straps.

* * * * *